US012240272B2

(12) United States Patent
Fernandez et al.

(10) Patent No.: US 12,240,272 B2
(45) Date of Patent: *Mar. 4, 2025

(54) TIRE HAVING AN IMPROVED TREAD

(71) Applicant: COMPAGNIE GENERALE DES ETABLISSEMENTS MICHELIN, Clermont-Ferrand (FR)

(72) Inventors: Miguel Fernandez, Clermont-Ferrand (FR); Regis Schach, Clermont-Ferrand (FR); Philippe Labrunie, Clermont-Ferrand (FR); Karine Longchambon, Clermont-Ferrand (FR); Alexandre Tobie, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 301 days.

This patent is subject to a terminal disclaimer.

(21) Appl. No.: 17/771,091

(22) PCT Filed: Oct. 15, 2020

(86) PCT No.: PCT/FR2020/051839
§ 371 (c)(1),
(2) Date: Apr. 22, 2022

(87) PCT Pub. No.: WO2021/079047
PCT Pub. Date: Apr. 29, 2021

(65) Prior Publication Data
US 2022/0371371 A1    Nov. 24, 2022

(30) Foreign Application Priority Data
Oct. 22, 2019  (FR) ...................................... 1911784

(51) Int. Cl.
*B60C 11/00*  (2006.01)

(52) U.S. Cl.
CPC ..... *B60C 11/005* (2013.01); *B60C 2011/0025* (2013.01); *B60C 2011/0033* (2013.01); *B60C 2200/04* (2013.01)

(58) Field of Classification Search
CPC . B60C 11/005; B60C 11/0323; B60C 19/082; B60C 2011/0025
See application file for complete search history.

(56) References Cited

U.S. PATENT DOCUMENTS 5,370,167 A * 12/1994 Kogure ..................... B60C 9/18
                                                            152/537
6,959,744 B2    11/2005 Sandstrom et al.
(Continued)

FOREIGN PATENT DOCUMENTS

EP    1431078 A1    6/2004
EP    2928707 A1    10/2015
(Continued)

OTHER PUBLICATIONS

English machine translation of JP2001088513. (Year: 2001).*
International Search Report dated Nov. 13, 2020, in corresponding PCT/FR2020/051839 (4 pages).

*Primary Examiner* — Robert C Dye
(74) *Attorney, Agent, or Firm* — VENABLE LLP

(57) ABSTRACT

A tire comprises an outer strip (2) having a tread (21). The outer strip (2) has a central part and two axially outer parts and comprises at least two rubber compounds (M1, M2) making up at least 90% of the volume of the outer strip (2). The first compound (M1) is radially outside of the second compound (M2), which makes up at least 60% of the axially outer parts and being disposed in a layer that is substantially continuous from one axially outer part to the other, said layer having a minimum thickness at least equal to 0.3 mm. The compound M1 has a modulus G* that is greater than 1.35 times and less than 3 times that of the compound M2. The (Continued)

compound M1 has a dynamic loss at 0° C. greater than 0.5 and the compound M2 has a dynamic loss at 23° C. less than 0.3.

14 Claims, 1 Drawing Sheet

(56) References Cited

U.S. PATENT DOCUMENTS

| | | | |
|---|---|---|---|
| 9,358,840 | B2 | 6/2016 | Bijaoui |
| 10,023,011 | B2 | 7/2018 | Gayton et al. |
| 10,710,414 | B2 | 7/2020 | Bourgeois et al. |
| 11,084,329 | B2 | 8/2021 | Uchida et al. |
| 11,518,194 | B2 | 12/2022 | Perrin et al. |
| 2004/0050469 | A1* | 3/2004 | Sandstrom ............ B60C 1/0016 152/209.5 |
| 2004/0118495 | A1 | 6/2004 | Sandstrom et al. |
| 2009/0107597 | A1* | 4/2009 | Loewenhaupt ......... B60C 11/00 152/209.5 |
| 2010/0224295 | A1* | 9/2010 | Aoki .................... B60C 11/005 152/209.1 |
| 2010/0264610 | A1* | 10/2010 | Custodero ........... B60C 11/0332 280/5.521 |
| 2012/0298270 | A1* | 11/2012 | Berger ................ B60C 11/1281 152/209.18 |
| 2012/0298271 | A1 | 11/2012 | Bijaoui |
| 2013/0213542 | A1* | 8/2013 | Warfford ................. B60C 11/12 152/209.1 |
| 2015/0107735 | A1* | 4/2015 | Djelloul-Mazouz ........................ B60C 11/0058 152/209.1 |
| 2016/0137001 | A1 | 5/2016 | Bourgeois et al. |
| 2017/0008345 | A1 | 1/2017 | Gayton et al. |
| 2017/0259626 | A1* | 9/2017 | Hata ..................... B60C 11/005 |
| 2019/0255887 | A1 | 8/2019 | Perrin et al. |
| 2019/0270342 | A1 | 9/2019 | Uchida et al. |
| 2021/0347206 | A1* | 11/2021 | Nakatani ................. B60C 11/00 |
| 2022/0371370 | A1 | 11/2022 | Fernandez et al. |

FOREIGN PATENT DOCUMENTS

| | | | | |
|---|---|---|---|---|
| EP | 3007911 B1 | 8/2019 | | |
| FR | 2952855 A1 | 5/2011 | | |
| JP | 2001088513 A | * | 4/2001 | .......... B60C 11/005 |
| WO | 2018/002488 A1 | 1/2018 | | |
| WO | 2018/079799 A1 | 5/2018 | | |

* cited by examiner

TIRE HAVING AN IMPROVED TREAD

BACKGROUND

The present invention relates to a tyre intended to be fitted to a passenger vehicle, and more particularly to the crown of such a tyre.

Since a tyre has a geometry which exhibits symmetry of revolution about an axis of rotation, the geometry of the tyre is generally described in a meridian plane containing the axis of rotation of the tyre. For a given meridian plane, the radial, axial and circumferential directions denote the directions perpendicular to the axis of rotation of the tyre, parallel to the axis of rotation of the tyre and perpendicular to the meridian plane, respectively. The median circumferential plane referred to as the equatorial plane divides the tyre into two substantially symmetrical half-torus shapes, it being possible for the tyre to exhibit tread or architecture asymmetries that are connected with the manufacturing precision or with the sizing.

In the following text, the expressions "radially on the inside of" and "radially on the outside of" mean "closer to the axis of rotation of the tyre, in the radial direction, than" and "further away from the axis of rotation of the tyre, in the radial direction, than", respectively. The expressions "axially on the inside of" and "axially on the outside of" mean "closer to the equatorial plane, in the axial direction, than" and "further away from the equatorial plane, in the axial direction, than", respectively. A "radial distance" is a distance with respect to the axis of rotation of the tyre and an "axial distance" is a distance with respect to the equatorial plane of the tyre. A "radial thickness" is measured in the radial direction and an "axial width" is measured in the axial direction.

A tyre comprises a crown comprising a crown reinforcement, and rubber compounds radially on the outside of this crown reinforcement, which are called outer strip.

A tyre also comprises two beads that are intended to come into contact with a rim, and two sidewalls that connect the crown to the beads. Furthermore, a tyre comprises a carcass reinforcement comprising at least one carcass layer that is radially on the inside of the crown and connects the two beads.

The outer strip comprises a tread that is intended to come into contact with the ground via a tread surface and rubber compounds between the tread and the crown reinforcement, called protective strip. The rubber compounds of the tread have hysteresis and stiffness characteristics that give the tyre acceptable performance in terms of dry and wet grip, road holding and wear. These characteristics differ between tyres intended for roads in temperate countries and tyres designed to be able to be used on snow-covered roads. In order to clearly mark these differences, legislators require tyre manufacturers to use specific markings, such as the M+S, MS, M&S, MS or M-S—mud and snow—marking, or the pictogram representing 3 snow-capped peaks and a snowflake, known to those skilled in the art as 3PMSF. These various markings correspond to tyres suitable for undergoing grip tests on snow-covered roads.

The outer strip does not comprise the rubber compounds disposed on the sidewall of the tyre, a portion of which could be radially on the outside and axially on the outside of the crown reinforcement. Sidewall compounds that have very specific compositions, in particular for resisting ultraviolet, are excluded from the surfaces and volumes of the outer strip. A rubber compound of the tyre of which more than 30% of the surface on a meridian section is radially on the inside of the radially innermost crown layer is not a compound of the outer strip but a sidewall compound.

The tread of a tyre is delimited, in the radial direction, by two circumferential surfaces of which the radially outermost is the tread surface and of which the radially innermost is referred to as the tread pattern bottom surface.

The portion of the tyre between the tread pattern bottom surface and the crown reinforcement is called protective strip. The protective strip has a radial thickness at least equal to 1.5 mm and often between 2 and 3 mm, and one of the benefits thereof is to protect the crown reinforcement from attacks caused by the various obstacles that are present on the road.

The outer strip comprises one or more rubber compounds. The expression "rubber compound" denotes a composition of rubber comprising at least an elastomer and a filler.

The crown comprises at least one crown reinforcement radially on the inside of the outer strip. The crown reinforcement comprises at least one working reinforcement comprising at least one working layer made up of mutually parallel reinforcing elements that form, with the circumferential direction, an angle of between 15° and 50°. The crown reinforcement may also comprise a hoop reinforcement comprising at least one hooping layer made up of reinforcing elements that form, with the circumferential direction, an angle of between 0° and 10°, the hoop reinforcement usually, but not necessarily, being radially on the outside of the working layers.

In order to obtain good grip on wet ground, cuts are made in the tread. A cut denotes either a well, or a groove, or a sipe, or a circumferential furrow, and forms a space opening onto the tread surface.

A sipe or a groove has, on the tread surface, two characteristic main dimensions: a width W and a length Lo, such that the length Lo is at least equal to twice the width W. A sipe or a groove is therefore delimited by at least two main lateral faces that determine its length Lo and are connected by a bottom face, the two main lateral faces being spaced apart from one another by a non-zero distance referred to as the width W of the sipe or of the groove.

The depth of the cut is the maximum radial distance between the tread surface and the bottom of the cut. The maximum value of the depths of the cuts is called tread pattern height D. It is common for the depths of the tread pattern to be degressive over the axially outermost circumferential portions of the tread, which are referred to as shoulders. The tread pattern bottom surface, or bottom surface, is a toric surface passing through the radially innermost points of the cuts.

A tyre needs to meet numerous performance criteria relating to phenomena such as wear, grip on various types of ground, rolling resistance, dynamic behaviour, and mass. These performance criteria sometimes lead to solutions that compromise other criteria. Thus, for good grip, the rubber material of the tread needs to be dissipative and soft. By contrast, in order to obtain a tyre that performs well in terms of behaviour, in particular in terms of dynamic response to transverse loading of the vehicle and therefore loading mainly along the axis of rotation of the tyre, the tyre needs to have a sufficiently high level of stiffness, in particular under transverse loading. For a given size, the stiffness of the tyre is dependent on the stiffness of the various elements of the tyre that are the tread, the crown reinforcement, the sidewalls and the beads. The tread is traditionally stiffened either by stiffening the rubber materials, or by reducing the depth of the tread pattern or by reducing the groove-to-rubber ratio of the tread pattern or the thickness of the protective layer. The protective strip has been made from the same rubber compound as the tread for a long time, but the need to improve performance, in particular in terms of rolling resistance, has led to the use of two materials that are specialized for each of the functions. Thus, since the protective layer is not designed to be in contact with the ground, it is constituted by compounds that are not very dissipative and therefore have very low grip and very poor performance in terms of wear.

In a need for constant improvement, manufacturers have constantly pushed towards increasing the number of rubber compounds in the tread in accordance with the various operating points. With the objective of improving performance, EP 3007911 describes a tyre provided with two rubber compounds, one better in terms of dry grip and the other better in terms of wet grip, which are disposed on different axial edges of the ribs of the tread.

These solutions are not always satisfactory. Increasing the number of rubber compounds in the tread poses problems for recycling. Since the rubber compounds are produced in industrial mixers in significant minimum quantities with ageing deadlines, the higher the number of rubber compounds, the more the risk of having materials that are unfit for their use increases and therefore the more the number of pieces of waste or scrap increases. One possibility for reducing these losses is to reintroduce the scrap into the manufacturing process. Furthermore, the treads comprising several rubber compounds are manufactured by coextrusion such that scrap following extrusion can be re-incorporated only insofar as the compounds that make it up are compatible with each other in terms of performance. This is not necessarily the case between the protective strips and the materials that are suitable for being incorporated in the composition of a tread; such a solution therefore increases the waste. Manufacturers are extremely concerned about the preservation of natural resources and therefore seek solutions for reducing these losses. At the same time, it is not possible to degrade the rolling resistance of the tyre because this characteristic is directly related to the consumption of energy by the tyre, and is an essential factor in the impact of the tyre on the environment. Furthermore, this solution is not completely satisfactory in terms of grip at the end of life, the protective strip having a negative impact on this performance aspect. All these points remain valid for tyres intended for use on snow-covered roads, the materials of the outer strip having by contrast to be tested at temperatures reflecting their specific characteristics of use.

Other tyres are described in the documents EP1431078, WO2018079799 and EP2928707.

The main objective of the present invention is therefore to increase the compromise between the recycling capacity, the rolling resistance and the grip of a tyre designed to be used on a snow-covered road and in particular at the end of its life.

SUMMARY OF THE INVENTION

This objective is achieved by a tyre, for a passenger vehicle, bearing a marking on the sidewall that indicates that it is designed to be used on a snow-covered road, comprising a crown comprising an outer strip having a tread that is intended to come into contact with the ground via a tread surface, two beads that are intended to come into contact with a rim, and two sidewalls that connect the crown to the beads, the outer strip being radially on the outside of a crown reinforcement comprising crown layers comprising reinforcing elements, and the tread being axially on the inside of the part of the sidewalls that is radially on the outside of the crown reinforcement, the outer strip being constituted of a central part and two axially outer parts, the central part of the outer strip having an axial width equal to 80% of the axial width of the tread surface, the outer strip comprising at least two rubber compounds, these two rubber compounds making up at least 90% of the volume of the outer strip, the first rubber compound being radially on the outside of the second rubber compound, the second rubber compound making up at least 60% of the volume of the axially outer parts of the outer strip and being disposed in a layer that is substantially continuous from one axially outer part of the outer strip to the other, said layer having a minimum radial thickness at least equal to 0.3 mm, the first rubber compound having a dynamic shear modulus G*, at 10% deformation at 10 Hz at 23° C. measured in accordance with standard ASTM D 5992-96, at least equal to 1.35 times the dynamic shear modulus G*, at 10% deformation at 10 Hz at 23° C. measured in accordance with standard ASTM D 5992-96, of the second rubber compound and at most equal to 3 times the dynamic shear modulus G*, at 10% deformation at 10 Hz at 23° C. measured in accordance with standard ASTM D 5992-96, of the second rubber compound, the first rubber compound having a dynamic loss tan D-10_1, measured in accordance with standard ASTM D 5992-96, at a temperature of −10° C. and under a stress of 0.7 MPa at 10 Hz, at least equal to 0.5, the second rubber compound having a dynamic loss tan D23_2, measured in accordance with the same standard ASTM D 5992-96, at a temperature of 23° C. and under a deformation of 10% at 10 Hz, at most equal to 0.3.

BRIEF DESCRIPTION OF THE FIGURES

The invention as well as its advantages will be easily understood in the light of the detailed description and the non-limiting exemplary embodiments which follow, as well as from FIGS. 1 to 3, in which.

DETAILED DESCRIPTION

Figure 1:
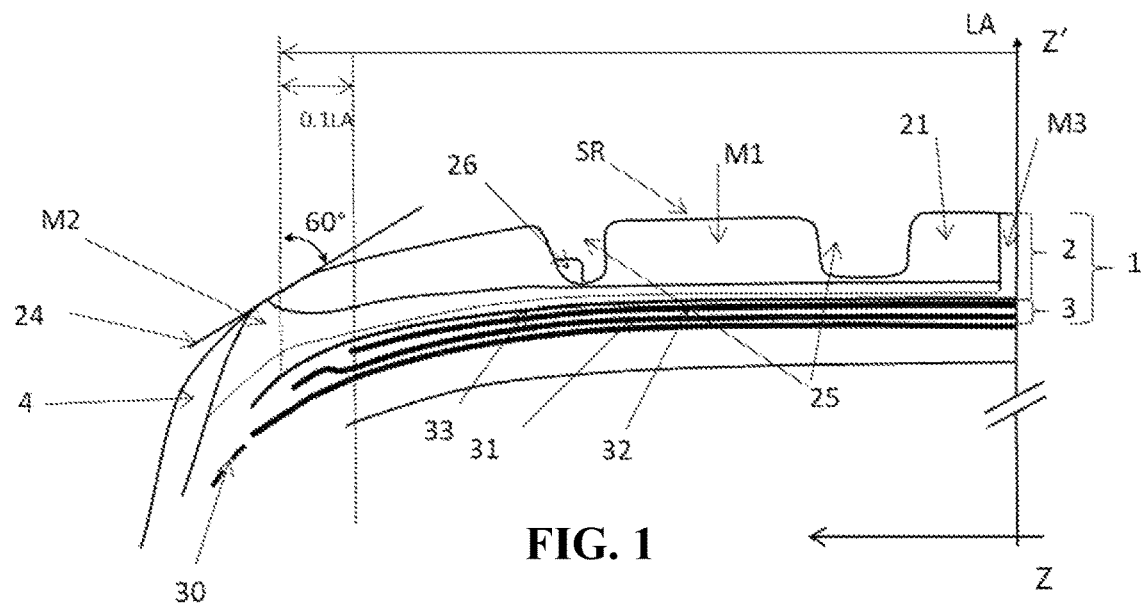
FIG. 1 schematically depicts the meridian half-section through the crown of the tire according to the invention.

The tyre thus described comprises an outer strip comprising two rubber compounds, one disposed in the centre and radially on the outside in the new state of the tyre and the other, which is less rigid, disposed:

around the equatorial plane, radially on the inside of the tread occupying a particular percentage of the protective strip on the laterally outer portions of the outer strip and of the tread near the ends of the crown layers, called shoulders, a greater or lesser percentage depending on the targeted performance aspects of the protective strip and of the tread.

This configuration is not necessarily symmetrical on either side of the equatorial plane and may be effective only on one of the two shoulders.

In order to improve the rolling resistance, it is customary to increase the number of rubber materials by using materials with the lowest possible hysteresis on the portions of the tyre that allow this. Thus, the protective strip is usually a compound of very low hysteresis that is able to absorb the energy of an impact due to running over an obstacle, while at the same time being protected from the attack of contact of this obstacle by the material of the tread that has the characteristics suitable for this function.

It is also possible to improve the rolling resistance by reducing the stiffness of materials under certain conditions. At their axial ends, the crown layers have a double curvature, one being circumferential, equivalent to the central part of the tread, and the other being axial due to the curvature of the carcass layer and therefore of the crown layers on this portion. The necessary flattening energy is therefore all the higher. In order to improve the performance in terms of rolling resistance, for a tyre with a given rubber compound for the central part of the tread, it is therefore possible to lower the stiffness of the compounds at the shoulders on the outermost parts of the outer strip within or beyond the limit of the tread surface.

For a significant improvement in rolling resistance, it is necessary for this percentage of the second rubber compound to be at least equal to 60% of the volume of the axially outer parts of the outer strip. This second rubber compound has to have stiffness and grip properties such that it can be in contact with the ground on which the tyre is running either in the new state or in the worn state and therefore such that it has hysteretic properties that are compatible with this function and therefore less favourable a priori than the protective compounds usually used to lower rolling resistance.

The solution with three compounds, one of which is the protective compound, the properties of which are very different from the two other rubber compounds, unacceptably degrades the capacity to recycle these compounds for uses related to tyres in which the compositions are very precise. Furthermore, the use of such compounds for the protective strip degrades the grip of the tyres, in particular at the end of their life. Specifically, in a surprising manner, the grip is not only dependent on the material in contact with the ground but also on the materials of the protective strip.

The invention therefore consists in using a single rubber compound for the protective strip and for the largest portion of the axially outer parts of the outer strip. This said compound has to be of lower stiffness than the rubber compound that is radially outermost at the centre of the tread. This rubber compound has to be suitable for contact with the ground on which the tyre is running either in the new state or in the worn state. The minimum thickness of a protective strip is at least equal to 0.3 mm, preferably at least equal to 0.6 mm, at least equal to 1 mm; the substantially continuous part constituted by said compound between the two axially outer parts of the outer strip has to have the same properties.

For optimum performance in terms of behaviour and uniformity of wear, and to allow recycling of scrap, the first rubber compound has a dynamic shear modulus $G^*$, at 10% deformation at 10 Hz at 23° C. measured in accordance with standard ASTM D 5992-96, at least equal to 1.35 times the dynamic shear modulus $G^*$, at 10% deformation at 10 Hz at 23° C. measured in accordance with standard ASTM D 5992-96, of the second rubber compound and at most equal to 3 times the dynamic shear modulus $G^*$, at 10% deformation at 10 Hz at 23° C. measured in accordance with standard ASTM D 5992-96, of the second rubber compound, For optimum performance in terms of grip on snow-covered ground, the first rubber compound has a dynamic loss tan $D\text{-}10\_1$, measured in accordance with standard ASTM D 5992-96, at a temperature of −10° C. and under a stress of 0.7 MPa at 10 Hz, at least equal to 0.5, preferably at least equal to 0.7.

For optimum performance in terms of rolling resistance, the second rubber compound has a dynamic loss tan $D23\_2$, measured in accordance with the same standard ASTM D 5992-96, at a temperature of 23° C. and under a deformation of 10% at 10 Hz, at most equal to 0.3.

Preferably, although there are rubber compounds that are able to be in contact with the ground that are less stiff, the second rubber compound has a dynamic shear modulus $G^*$, at 10% deformation at 10 Hz at 23° C. measured in accordance with standard ASTM D 5992-96, at least equal to 0.8 MPa and at most equal to 4 MPa, preferably at least equal to 1 MPa and at most equal to 2.5 MPa, for good performance in terms of wear and behaviour.

For uses with high speed ratings and therefore generally drift rates that are also higher, it is preferred that the second rubber compound has a secant extension modulus MA300 at 300% deformation, measured at 23° C. in accordance with standard ASTM D 412-16, at least equal to 1.7 in order to ensure a correct wear pattern on the axially outer part of the outer strip for this use.

The properties of the rubber compounds are measured in accordance with standard ASTM D 5992-96. For example, the dynamic shear moduli $G^*$ and tan $\delta$ are measured at 23° C. at 10% deformation at 10 Hz, in accordance with standard ASTM D 5992-96. The response of a sample of cross-linked composition (preferably cylindrical test specimen with a thickness of 4 mm and a cross section of 400 mm2), subjected to a simple alternating sinusoidal shear stress, at a frequency of 10 Hz, at 23° C. in accordance with standard ASTM D 5992-96, is recorded. A peak-to-peak strain amplitude sweep is carried out from 0.1 to 100% (outward cycle) and then from 100 to 0.1% (return cycle). The result that is made use of is the loss factor (tan($\delta$)). For the return cycle, the maximum value of tan($\delta$) observed (tan($\delta$)max at 23° C.) and the modulus $G^*$ are indicated.

Surprisingly, by coupling the axially outer parts of the outer strip and protective strip through the use of a single material, the rolling resistance is improved compared with a solution with two rubber compounds, one for the tread and the other for the protective strip, and retained or slightly improved compared with a solution with three rubber compounds including a specific one for the protective strip. Furthermore, the invention brings about an obvious improvement in recycling capacity.

Since the tyre is toric, the volume ratios between the two rubber compounds of the outer strip are evaluated from the surface areas of these materials, which are measured on one or more meridian sections, taking into account the volumetric void ratio of the tread pattern. This practice is well known to those skilled in the art.

When the first rubber compound is axially on the inside of the second rubber compound, it is necessary to ensure that the interface between the two first and second compounds of the outer strip of the tyre is maintained. To this end, the interface between the first and the second rubber compounds has to form an angle with the normal to the tread surface at the point of intersection of the interface with the tread surface that is at most equal to 60° in terms of absolute value, preferably at most equal to 20° in terms of absolute value. For angles outside these ranges, the shear forces under transverse cornering forces subject the interface of the two products to deformations risking progressive microcracking of the interface at the zone of contact with the ground on which the tyre is running. The parts axially on the outside of these microcracks are gradually torn away, generating an irregular wear zone.

For application to tyres intended for sports cars for which the behaviour is a favoured performance aspect, it is preferred that the layer of the second rubber compound, which is continuous from one outer part of the outer strip to the other, is radially on the inside, in the central part of the tread, of the bottom surfaces of the grooves or of the circumferential furrows of the tread. In this case, the central part of the outer strip is predominantly made up of the first rubber compound, which is the most rigid, and this ensures a high stiffness of the tread pattern.

In order to improve wear and grip at the end of life, the invention may comprise grooves or circumferential furrows that are configured such that the void ratio of the tread surface increases with wear of the tyre, such as droplet-shaped knife cuts, voids that are hidden in the new state, angles of the lateral faces of the cuts that are configured such that the surface void ratio of said cut increases with wear.

In order to achieve the targeted mechanical properties of the first and second rubber compounds, in particular for their properties in terms of rolling resistance and grip, it is preferred that the first and second rubber compounds have reinforcing fillers made up of at least 80% silica, expressed as a percentage of the total mass of the reinforcing fillers.

For ease of fitting on the vehicle, and in particular for symmetrical, non-directional tyres, it is preferred that the volumes of first and second rubber compounds of the outer strip are substantially symmetrical with respect to the equatorial plane.

The invention requires that the outer strip is made up, to at least 90% by volume, of the two rubber compounds, the remaining 10% being provided for the possible use of other rubber compounds so as to fulfil other functions such as for example the electrical conductivity of the tyre or ensure the bonding of the outer strip to the crown reinforcement.

The optimal solution is that the tread is made up of two rubber compounds and one of these rubber compounds is an electrical conductor and is configured such that the electrical resistance of the tyre, measured in accordance with standard ISO 16392:2017, is at most equal to $10^{10}$ ohms, preferably at most equal to $10^8$ ohms.

In the case in which the first and second rubber compounds of the outer strip are not sufficiently conductive to comply with standard ISO 16392:2017, an advantageous solution is that the outer strip is made up of three rubber compounds, the third rubber compound being disposed between the radially outermost layer of reinforcing elements of the crown reinforcement and the tread surface and configured such that the electrical resistance of the tyre, measured in accordance with standard ISO 16392:2017, is at most equal to $10^{10}$ ohms, preferably at most equal to $10^8$ ohms. This rubber compound is a compound designed to be incorporated into the tread while at the same time containing a portion of conductive filler, usually carbon black. Its properties mean that it is able to be recycled with the first or second rubber compound of the tread, all the more so if its volume is low. In this case, there is a very localized discontinuity contingent on the electrical conductivity function in the layer of the second rubber compound, this being the only exception to the continuity of this said layer indicated by the term "substantially" continuous.

In order to obtain optimum performance in terms of rolling resistance, it is common for the rubber compounds that are able to be in contact with the ground on which the tyre is running in the new state, or in the worn state, to have a high content of silica, and this can lead to inadequate performance in terms of bonding on the crown layers during the manufacture of the tyre, before it is cured. It is customary in this case to use an intermediate rubber called a bonding rubber to allow the adhesion of the compounds of the protective strip and the tread to the crown layers. This bonding layer never has a radial thickness greater than 0.6 mm.

In the case in which there is a problem of tack in manufacture between the second rubber compound and the radially outermost crown layer, and the first and second compounds are electrically conductive to the point of complying with standard ISO 16392:2017, the preferred solution is that the outer strip is made up of three rubber compounds and the third rubber compound is disposed between the radially outermost layer of reinforcing elements of the crown reinforcement and the second rubber compound, the maximum thickness of this third rubber compound being at most equal to 0.6 mm, preferably at most equal to 0.4 mm.

In the case in which there is a problem of tack in manufacture between the second rubber compound and the radially outermost crown layer, and the first and second compounds are not sufficiently electrically conductive to comply with standard ISO 16392:2017, an advantageous solution is that the outer strip is made up of four rubber compounds, wherein the third rubber compound is disposed between the radially outermost layer of reinforcing elements of the crown reinforcement and the second rubber compound, the maximum thickness of this third rubber compound is at most equal to 0.4 mm, and wherein the fourth rubber compound is disposed between the radially outermost layer of reinforcing elements of the crown reinforcement and the tread surface and designed such that the electrical resistance of the tyre, measured in accordance with standard ISO 16392:2017, is at most equal to $10^{10}$ ohms, preferably at most equal to $10^8$ ohms.

In order to improve the recyclability of the compounds, the total volume of the second rubber compound represents at least 25% and at most 50% of the volume of the outer strip.

Manufacturing the tyre generates extruded materials of rubber compounds that will not be used for the manufacture of tyres, called scrap. For example, the adjustment of a machine during a change of size generates such scrap and in particular scrap made up of rubber compounds of the outer strip, in particular of the tread and of the protective strip. In the case of configurations with a plurality of rubber compounds in the outer strip, the scrap is called mixed scrap. In order to reduce the scrap that is not put to profitable use in the tyre, receiving volumes in a rubber compound called the "host" compound are defined in the compounds of the outer strip. Those skilled in the art are aware of the complexity of mixing the host compound and the mixed scrap, which requires machine occupation time for the homogenization of the host compound with the scrap. This implies that a single rubber compound is a "host" compound, unless there is a loss in productivity or in recycling rate.

The portions of the radially outer compounds that have a high level of contact with the road cannot be used for incorporating scrap so as not to modify or impair the performance of the tyre. Thus, for configurations with two materials, one for the protective strip and one for the tread, only the protective strip can be a host compound, with a volume of host compound at most equal to 20% of the volume of the outer strip. For configurations with three rubber compounds, one protective strip and two different compounds in the tread, only the protective strip can be a host compound, with a volume of host compound at most equal to 20% of the volume of the outer strip. For the tyre according to the invention, the second rubber compound constituting the volume of the protective strip and a part of the tread and having a low level of contact, only in cornering under high lateral force, constitutes a volume at least equal to 25% of the volume of the outer strip, preferably at least equal to 40%. This greater volume naturally allows a greater volume of mixed scrap to be incorporated.

The usable volume of mixed scrap per tyre is defined by the receiving volume and the maximum admissible content of mixed scrap in this rubber compound, because although it is possible to incorporate mixed scrap into the host rubber compound, it is not possible to integrate too high a content thereof at the risk of seeing its properties modified beyond what is desirable. It is thus possible to calculate the recycling power Pr, which is equal to the admissible percentage of mixed scrap in the total volume of the outer strip. Pr is equal to the volume of the host rubber compound multiplied by the maximum percentage of mixed scrap in the host compound.

By taking a maximum percentage of mixed scrap in the host compound of 10% by volume, the invention makes it possible to recycle at least 20% more mixed scrap and up to 100% more compared with the prior art.

Figure 2:
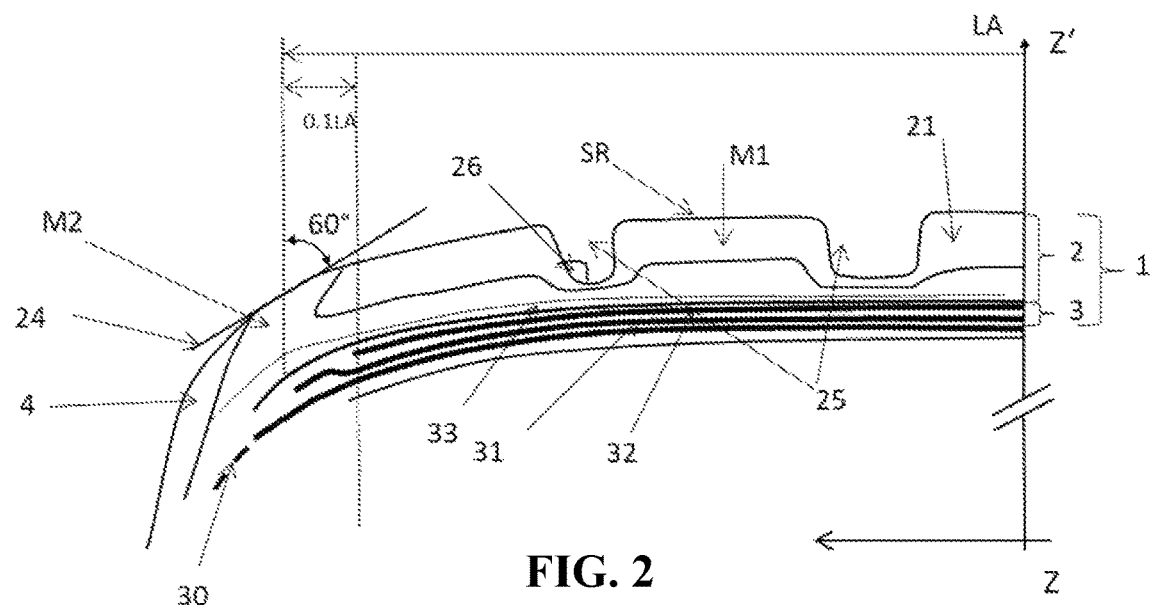
FIG. 2 schematically depicts a variant of the invention with respect to FIG. 1.
Figure 3:
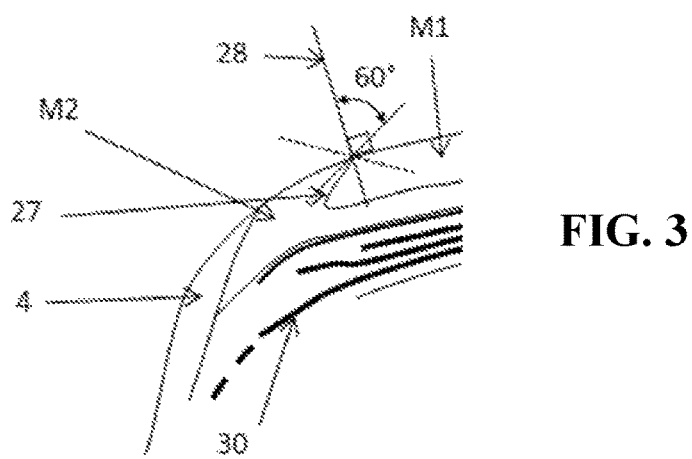
FIG. 3 shows a detail of the outer strip 2 and the interface 27 between the first rubber compound M1 and the second rubber compound M2 in the axially outer part of the outer strip.

The features and the other advantages of the invention will be understood better with the aid of FIGS. 1 to 3, said figures not being drawn to scale but in a simplified manner so as to make it easier to understand the invention. FIGS. 1 to 3 are parts of a tyre, in particular the crown reinforcement and outer strip and sidewall thereof.

FIG. 1 schematically depicts the meridian half-section through the crown of the tyre according to the invention. It illustrates in particular the crown 1 comprising an outer strip 2 comprising a tread 21 that is intended to come into contact with the ground via a tread surface SR of width LA. The crown 1 also comprises a crown reinforcement 3, comprising three layers of reinforcing elements 31, 32, 33 radially on the outside of the carcass layer 30. The outer strip 2 is radially on the outside of the radially outermost layer of reinforcing elements 33 of the crown reinforcement 3 and axially on the inside of the part of the sidewalls 4 that is radially on the outside of the crown reinforcement 3.

The outer strip is made up in this example of three rubber compounds M1, M2 and M3. The first rubber compound M1 is radially on the outside of the second rubber compound M2 and they represent at least 90% of the volume of the outer strip 2—in this case 97%, the remaining 3% consisting of M3. The outer strip has a central part with a width equal to 80% of the tread surface SR and two axially outer parts. The axially outer parts of the outer strip are made up of at least 60% by volume of the second compound M2. The second compound M2 is substantially continuous from one outer part of the outer strip to the other, i.e. it is continuous except if a compound M3 binds the crown layers to the tread surface in order to ensure the compliance of the tyre with the standard on the electrical conductivity of tyres.

In FIG. 1, the axial borders of the tread surface are determined in a meridian plane, which axial borders make it possible to measure the tread width in this meridian plane. In some cases, the width of the tread surface is trivially determined by those skilled in the art, since the axially outermost rib of the tread on either side of the equatorial plane has a clear discontinuity allowing simple measurement. In FIG. 1, which shows the case of a number of tyres for passenger vehicles in which the tread surface SR is continuous with the outer surface of the sidewall, the tangent 24 to the tread surface SR at any point on said tread surface in the region of transition towards the sidewall is plotted on a meridian section of the tyre, which is in the fitted position and inflated to nominal pressure. On each side of the equatorial plane, the axial border passes through the point for which the angle between said tangent 24 and an axial direction ZZ' is equal to 60°. When, in a meridian plane, there are several points on one and the same side of the equatorial plane for which the angle between said tangent and an axial direction ZZ" is equal to 60°, it is the radially outermost point that is adopted. The width of the tread, at the meridian plane, is the axial distance between the two points of the two axial borders of the tread surface. The width of the tread of the tyre is the maximum value of the widths of the tread over all the meridians.

FIG. 2 gives a variant of the invention with respect to FIG. 1, in which the rubber compound M2 opens onto the tread surface and in which the interface with the rubber compound M1 is radially on the outside of the radially innermost points of the bottom surfaces of the circumferential furrows and the grooves 25. In versions in which rolling resistance would be the most desirable performance aspect, this interface could be radially on the outside of the wear indicator 26. Specifically, M2 is configured to be in contact with the ground on which the tyre is running.

FIG. 3 shows a detail of the outer strip 2 and the interface 27 between the first rubber compound M1 and the second rubber compound M2 in the axially outer part of the outer strip. The first rubber compound M1 is axially on the inside of the second rubber compound M2, and therefore the second rubber compound M2 opens onto the external surface of the outer strip 2 at the tread surface SR or onto the external surface of the outer strip outside the tread surface. The interface between the first and the second rubber compounds forms an angle with the normal 28 to the tread surface at the point of intersection of the interface with the outer surface of the outer strip that is at most equal to 60° in terms of absolute value.

A meridian section through the tyre is obtained by cutting the tyre on two meridian planes.

The invention has been carried out on a tyre of size 225/45 ZR17 intended to be fitted to a passenger vehicle satisfying the conditions for being marked with the symbol 3PMSF authorizing its use on snow-covered roads on European territory. The depths D of the grooves of the tread pattern are between 4 and 8 mm.

The inventors have a plurality of rubber compounds that originate from the same manufacturing technology and from the same raw materials and that are able to constitute the central part of the outer strip. The materials in question vary in terms of properties between a rather rigid, adherent and hysteretic rubber compound MT1 and a material MT2 that is less rigid, less adherent and less hysteretic than MT1.

The rubber compound MT1 has an elastic shear modulus G*, at 10% deformation at 10 Hz at 23° C. measured in accordance with standard ASTM D 5992-96, equal to 2.65 MPa, a dynamic loss tan D-10_1, measured in accordance with standard ASTM D 5992-96, at a temperature of −10° C. and under a stress of 0.7 MPa at 10 Hz, equal to 0.73 and a dynamic loss tan D23_2, measured in accordance with the same standard ASTM D 5992-96, at a temperature of 23° C. and under a deformation of 10% at 10 Hz, equal to 0.55.

The rubber compound MT2 has an elastic shear modulus G*, at 10% deformation at 10 Hz at 23° C. measured in accordance with standard ASTM D 5992-96, equal to 1.45 MPa, a dynamic loss tan D-10_2, measured in accordance with standard ASTM D 5992-96, at a temperature of −10° C. and under a stress of 0.7 MPa at 10 Hz, equal to 0.31 and a dynamic loss tan D23_2 measured in accordance with the same standard ASTM D 5992-96, at a temperature of 23° C. and under a deformation of 10% at 10 Hz, equal to 0.19.

For tyres according to the prior art, the compound that is able to be in contact with the ground is combined with a rubber compound for the protective strip of an almost constant thickness equal to 2.1 mm on average, representing 20% of the volume of the outer strip, and of which the dynamic loss tan D23_2 measured in accordance with the same standard ASTM D 5992-96, at a temperature of 23° C. and under a deformation of 10% at 10 Hz, is equal to 0.12, with the objective of best optimizing the rolling resistance.

By varying the properties of the material that is able to be in contact with the ground between the properties of the rubber compounds MT1 and MT2, a person skilled in the art can design tyres according to a certain compromise between rolling resistance and grip.

The inventors have also produced a tyre according to the invention in which the radially outer compounds are made up of the first rubber compound MT1 and the second rubber compound MT2. The axially outer parts of the outer strip of the tyre comprise at least 85% by volume of the second rubber compound MT2. The rubber compound MT2 is continuous from one axially outer part to the other of the outer strip 2 over an almost constant thickness of 2.1 mm. In total, the volume of the first rubber compound MT1 represents 57% of the total volume of the outer strip.

Compared to tyres according to the prior art, the invention either, for identical grip, in particular on snow-covered ground, improves the compromise in terms of rolling resistance by approximately 5%, or for the same rolling resistance and the same grip on snow-covered ground, improves wet grip by 3%, the performance being measured on circuits.

Furthermore, the recycling capacity of the MT1 and MT2 compounds is increased by 100% compared with tyres outside the invention.

The invention claimed is:

1. A tire, for a passenger vehicle, bearing a marking on a sidewall that indicates that it is designed to be used on a snow-covered road, comprising:
    a crown comprising an outer strip having a tread that is intended to come into contact with the ground via a tread surface, two beads that are intended to come into contact with a rim, and two sidewalls that connect the crown to the beads,
    the outer strip being radially on the outside of a crown reinforcement comprising crown layers comprising reinforcing elements, and the tread being axially on the inside of the part of the sidewalls that is radially on the outside of the crown reinforcement,
    the outer strip being constituted of a central part and two axially outer parts,
    the central part of the outer strip having an axial width equal to 80% of an axial width of the tread surface,
    the outer strip comprising at least two rubber compounds, the two rubber compounds making up at least 90% of the volume of the outer strip,
    the first rubber compound being radially on an outside of the second rubber compound, the second rubber compound making up at least 60% of a volume of the axially outer parts of the outer strip and being disposed in a layer that is substantially continuous from one axially outer part of the outer strip to the other, the layer having a minimum radial thickness at least equal to 0.3 mm,
    wherein the first rubber compound has a dynamic shear modulus G*, at 10% deformation at 10 Hz at 23° C. measured in accordance with standard ASTM D 5992-96, at least equal to 1.35 times a dynamic shear modulus G*, at 10% deformation at 10 Hz at 23° C. measured in accordance with standard ASTM D 5992-96, of the second rubber compound and at most equal to 3 times the dynamic shear modulus G*, at 10% deformation at 10 Hz at 23° C. measured in accordance with standard ASTM D 5992-96, of the second rubber compound,
    wherein the first rubber compound has a dynamic loss tan D-10_1, measured in accordance with standard ASTM D 5992-96, at a temperature of −10° C. and under a stress of 0.7 MPa at 10 Hz, at least equal to 0.5,
    wherein the second rubber compound has a dynamic loss tan D23_2, measured in accordance with standard ASTM D 5992-96, at a temperature of 23° C. and under a deformation of 10% at 10 Hz, at most equal to 0.3, and
    wherein the first and second rubber compounds have reinforcing fillers made up of at least 80% silica, expressed as a percentage of a total mass of the reinforcing fillers.

2. The tire according to claim 1, wherein the second rubber compound has a dynamic shear modulus G*, at 10% deformation at 10 Hz at 23° C. measured in accordance with standard ASTM D 5992-96, at least equal to 0.8 MPa and at most equal to 4 MPa.

3. The tire according to claim 1, wherein the first rubber compound has a dynamic loss tan D-10_1, measured in accordance with standard ASTM D 5992-96, at a temperature of −10° C. and under a stress of 0.7 MPa at 10 Hz, at least equal to 0.7.

4. The tire according to claim 1, wherein the second rubber compound has a secant extension modulus MA300 at 300% deformation, measured at 23° C. in accordance with standard ASTM D 412-16, at least equal to 1.4 MPa.

5. The tire according to claim 1, wherein a total volume of the second rubber compound represents at least 25% and at most 50% of the volume of the outer strip.

6. The tire according to claim 1, wherein the second rubber compound is disposed in the layer that is substantially continuous from one axially outer part of the outer strip to the other, the layer having a minimum thickness at least equal to 0.6 mm.

7. The tire according to claim 1, wherein the first rubber compound is axially on an inside of the second rubber compound, and
    wherein an interface between the first and the second rubber compounds forms an angle with a normal to an external surface of the outer strip at a point of intersection of the interface with the external surface that is at most equal to 60° in terms of absolute value.

8. The tire according to claim 1, wherein the tread comprises grooves or circumferential furrows, and wherein the layer of the second rubber compound, which is substantially continuous from one outer part of the outer strip to the other, is radially on an inside, in the central part of the outer strip, of bottom surfaces of the grooves or of the circumferential furrows of the tread.

9. The tire according to claim 1, wherein the tread comprises grooves or circumferential furrows, and wherein the grooves or circumferential furrows are configured such that a surface void ratio of the tread surface increases with wear of the tire.

10. The tire according to claim 1, wherein volumes of the first and second rubber compounds of the outer strip are substantially symmetrical with respect to an equatorial plane.

11. The tire according to claim 1, wherein the outer strip is made up of two rubber compounds and one of the two rubber compounds is an electrical conductor and is configured such that an electrical resistance of the tire, measured in accordance with standard ISO 16392:2017, is at most equal to $10^{10}$ ohms.

12. The tire according to claim 1, wherein the outer strip is made up of three rubber compounds, the third rubber compound being disposed between a radially outermost layer of reinforcing elements of the crown reinforcement and the tread surface, and wherein the electrical resistance of the tire, measured in accordance with standard ISO 16392:2017, is at most equal to $10^{10}$ ohms.

13. The tire according to claim 1, wherein the outer strip is made up of three rubber compounds, and
   wherein the third rubber compound is disposed between a radially outermost layer of reinforcing elements of the crown reinforcement and the second rubber compound, the maximum thickness of the third rubber compound being at most equal to 0.6 mm.

14. The tire according to claim 1, wherein the outer strip is made up of four rubber compounds,
   wherein a third rubber compound is disposed between a radially outermost layer of reinforcing elements of the crown reinforcement and the second rubber compound, the maximum thickness of the third rubber compound being at most equal to 0.4 mm, and
   wherein a fourth rubber compound is disposed between the radially outermost layer of reinforcing elements of the crown reinforcement and the tread surface and configured such that an electrical resistance of the tire, measured in accordance with standard ISO 16392:2017, is at most equal to $10^{10}$ ohms.

* * * * *